US010573443B2

(12) United States Patent
Seidel et al.

(10) Patent No.: US 10,573,443 B2
(45) Date of Patent: Feb. 25, 2020

(54) PROCESS FOR PRODUCING MAGNETIC MONODISPERSE POLYMER PARTICLES

(71) Applicant: Roche Diagnostics Operations, Inc., Indianapolis, IN (US)

(72) Inventors: Christoph Seidel, Weilheim (DE); Jens Christian Bolle, Rotkreuz (CH); Sandra Recklies, Erlangen (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 15/170,251

(22) Filed: Jun. 1, 2016

(65) Prior Publication Data

US 2016/0276080 A1    Sep. 22, 2016

Related U.S. Application Data

(63) Continuation of application No. PCT/EP2014/076404, filed on Dec. 3, 2014.

(30) Foreign Application Priority Data

Dec. 4, 2013 (EP) .................................. 13195723

(51) Int. Cl.
| | | |
|---|---|---|
| *H01F 1/44* | (2006.01) | |
| *C08F 257/00* | (2006.01) | |
| *C08K 9/10* | (2006.01) | |

(52) U.S. Cl.
CPC .............. *H01F 1/44* (2013.01); *C08F 257/00* (2013.01); *C08K 9/10* (2013.01); *C08K 2201/01* (2013.01)

(58) Field of Classification Search
CPC ....... H01F 1/0063; C08F 257/00; C08K 9/10; C08K 2201/01
See application file for complete search history.

(56) References Cited

U.S. PATENT DOCUMENTS

| | | | |
|---|---|---|---|
| 4,339,337 A | 7/1982 | Tricot et al. | |
| 4,358,388 A | 11/1982 | Daniel et al. | |
| 4,707,523 A | 11/1987 | Chang et al. | |
| 7,282,540 B2 | 10/2007 | Ozaki et al. | |
| 7,598,316 B2 * | 10/2009 | Skagestad | B01J 20/26 252/62.54 |
| 7,981,512 B2 | 7/2011 | Tamori et al. | |
| 2007/0123639 A1 | 5/2007 | Inaba et al. | |
| 2010/0301257 A1 | 12/2010 | Modahl et al. | |
| 2012/0141798 A1 * | 6/2012 | Modahl | C08F 2/22 428/407 |

FOREIGN PATENT DOCUMENTS

| | | |
|---|---|---|
| EP | 1391899 A1 | 2/2004 |
| JP | H08-176212 A | 7/1996 |
| JP | 2006-257414 A | 9/2006 |
| JP | 2009-256639 A | 11/2009 |
| WO | 1983/003920 A1 | 11/1983 |
| WO | 2000/061647 A1 | 10/2000 |
| WO | 2009/137889 A1 | 11/2009 |
| WO | 2010/125170 A1 | 11/2010 |

OTHER PUBLICATIONS

Rahman et al, "Anisotropic magnetic microparticles from ferrofluid emulsion", Soft Matter, 7, 2011, pp. 1483-1490.*
International Search Report dated Jan. 30, 2015 in Application No. PCT/EP2014/076404, 4 pages.
Noguchi, Hiromichi et al., Preparation and Characterization by Thermal Analysis of Magnetic Latex Particles, Journal of Applied Polymer Science, 1993, pp. 1539-1547, vol. 48.
Okubo, M. et al., Preparation of micron-size monodisperse polymer particles by seeded polymerization utilizing the dynamic monomer swelling method, Colloid & Polymer Science, 1991, pp. 222-226, vol. 269.
Rahman, Mahbubor et al., Anisotropic magnetic microparticles from ferrofluid emulsion, Soft Matter, 2011, pp. 1483-1490, vol. 7.
Rittich, Bohuslav et al., Functionalised magnetic microspheres with hydrophilic properties for molecular diagnostic applications, Food Research International, 2009, pp. 493-498, vol. 42.
Ugelstad, J. et al., Monodisperse Magnetic Polymer Particles New Biochemical and Biomedical Applications, Blood Purification, 1993, pp. 349-369, vol. 11.
Yang, Jixin et al., Preparation of hybrid polymer nanocomposite microparticles by a nanoparticle stabilised dispersion polymerisation, Journal of Materials Chemistry, 2008, pp. 998-1001, vol. 18.

* cited by examiner

*Primary Examiner* — C Melissa Koslow
(74) *Attorney, Agent, or Firm* — Roche Diagnostics Operations, Inc.

(57) ABSTRACT

Disclosed is a simplified process for producing magnetic polymer particles. The process comprises: (a) providing a composition having a liquid monomer which is radical polymerizable, a radical initiator soluble in the monomer, a steric stabilizer, and a ferrofluid comprising surfactant-coated colloidal magnetic particles in a carrier fluid which is miscible with the monomer; (b) preparing an emulsion from a polar solvent which is immiscible with the monomer, and the composition of step (a); (c) adding seed polymer particles to the emulsion, mixing to form a seeded emulsion, and incubating the seeded emulsion, thereby swelling the seed polymer particles; and (d) activating the radical initiator and polymerizing the monomer in the swollen seed polymer particles; thereby producing the magnetic polymer particles. The process forms monodisperse magnetic particles. The particles are characterized by a uniform distribution of magnetic material, and an absence of magnetite bleeding.

7 Claims, 1 Drawing Sheet

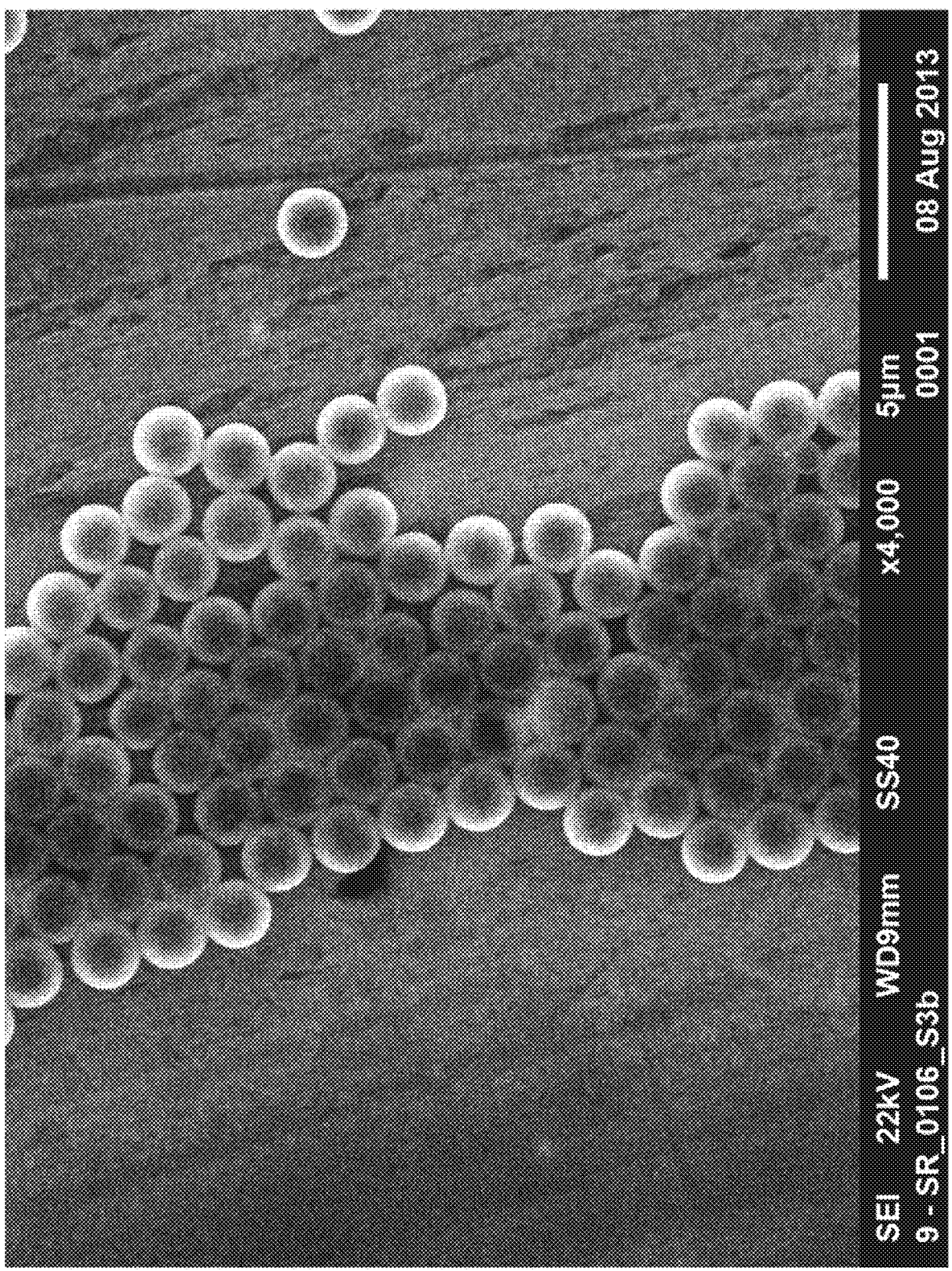

PROCESS FOR PRODUCING MAGNETIC MONODISPERSE POLYMER PARTICLES

CROSS-REFERENCE TO RELATED APPLICATIONS

This application is a continuation of International Patent Application PCT/EP2014/076404 filed Dec. 3, 2014, which claims priority to European Patent Application No. 13195723.5 filed Dec. 4, 2013, the disclosures of which are hereby incorporated by reference in their entirety.

The present disclosure deals with the preparation of monodisperse polymer particles starting from polymeric seed particles. Disclosed in here is a simplified process for producing magnetic polymer particles, the process comprising the steps of (a) providing a composition with the following components, a liquid monomer which is radical polymerizable, a radical initiator which is soluble in the monomer, a steric stabilizer, and a ferrofluid comprising surfactant-coated colloidal magnetic particles in a carrier fluid which is miscible with the monomer; (b) preparing an emulsion from a polar solvent which is immiscible with the monomer, and the composition of step (a); (c) adding seed polymer particles to the emulsion, mixing to form a seeded emulsion, and incubating the seeded emulsion, thereby swelling the seed polymer particles; (d) activating the radical initiator and polymerizing the monomer in the swollen seed polymer particles; thereby producing the magnetic polymer particles. As a result of the process monodisperse magnetic particles can be provided. The particles are characterized by a uniform distribution of magnetic material, and an absence of magnetite bleeding. Magnetic particles are being used extensively, e.g. for selective cell separation and for immunomagnetic separation within microbiology and molecular biology.

BACKGROUND

The so-called "successive seeded emulsion polymerization" technique, is a method of activated swelling of polymer particles. Importantly, the process allows the preparation of monodisperse spherical beads of predictable size from 1 to 100 µm in diameter (Ugelstad J. et al., Blood Purif. 11 (1993) 349-369). The polymer particles may be prepared from a number of different monomeric materials and with various morphologies including macroporous structures.

WO 2000/61647 discloses a process for the preparation of monodisperse polymer particles which are formed by contacting monomers with aqueous dispersions comprising monodisperse swellable seed polymers/oligomers, and initiating polymerisation in the presence of a steric stabilizer. The resulting swollen seed particles are characterised by the particle mode diameter.

The porous beads form the basis for magnetizable monodisperse polymer particles comprising magnetic iron oxides as small grains, e.g. present in the pore volumes of the beads. To this end, WO 2000/61647 mentions the concept coating of monodisperse polymer particles with magnetic coatings as a subsequent step after the swelling and polymerization steps. However, U.S. Pat. No. 4,707,523 particularly discloses preparation of monodisperse polystyrene microparticles. In an exemplary process, polystyrene seed particles were grown to a larger size by swelling the seed particles in a stirred emulsion comprising water, cyclohexane, styrene, divinyl benzene, benzoyl peroxide, and sodium dodecylsulfate. After a certain amount of time during which swelling was allowed to take place, the temperature of the mixture was raised, thereby starting the polymerization process which took place for a further amount of time. The resulting polystyrene microparticles were subsequently nitrated with concentrated $H_2SO_4/HNO_3$, thereby functionalizing the polymer with $—NO_2$ (nitro) groups. Such functionalized polymer particles were finally reacted with Fe powder in the presence of HCl, thereby oxidizing iron with the nitro groups. The reaction leads to a deposit of iron oxide on the surface of the polystyrene microparticles, as well as on the accessible surface of pores which may be present in the particles. Notably, the process of U.S. Pat. No. 4,707,523 is made up of three separate major steps—(i) generation of monodisperse particles, (ii) nitration of the particles, and (iii) metal oxide deposition. The nitration step requires the use of aggressive chemicals and therefore rather complex equipment for safe routine synthesis on a larger scale.

EP 1 391 899 A1 discloses another process for producing magnetic polymer particles. Firstly, there is provided a powder of hydrophobic polymer particles such as polystyrol particles which may be obtained as monodisperse polymer particles by way of a successive seeded emulsion polymerization process. The document discloses the first step of forming a colloidal dispersion, the dispersion comprising the particles as provided, further a finely divided magnetic material, e.g. in the form of a ferrofluid, and a non-polar organic solvent capable of penetrating the polymer particles. Thus, the ingredients were mixed to form a colloidal dispersion, incubation of which resulted in the swelling of the hydrophobic powder. During the swelling the polymer particles imbibed magnetic material. In a subsequent step, the non-polar organic solvent was removed, e.g. by way of evaporation or extraction, thereby resulting in polymer particles with trapped magnetic material. Notably, the EP 1 391 899 A1 discloses that the process may need to be performed repeatedly. Thus, the process might require further effort in order to achieve uptake of magnetic material in a desired quantity and/or with a desired reproducibility.

U.S. Pat. No. 4,339,337 discloses a process for the preparation of magnetic beads of vinylaromatic polymers, the process comprising the steps of dispersing a finely divided magnetic material in a solution of a polymerizeable vinylaromatic monomers, putting the resulting dispersion into suspension in water, and polymerizing the monomers. Exempary processes disclosed in the document show the production of magnetic particles having different sizes. The document appears to be silent regarding monodisperse particles.

U.S. Pat. No. 4,358,388 discloses a process for preparing magnetic-polymer latices. Magnetically charged particles are dispersed in an organic phase comprising an organically soluble initiator and an organic monomeric component such as a vinyl aromatic monomer. The dispersion is mixed with an aqueous solution containing an emulsifying agent and homogenized. Polymerization is then effected to form a magnetic polymer latex. In an embodiment, organic monomer component may be added immediately prior to or during polymerization.

The object of the disclosure reported herein was to establish a simple, fast and reproducible method to produce magnetic polymer particles which are monodisperse and contain a defined amount of magnetic material, wherein the magnetic material is evenly distributed throughout the entire volume of the polymer particle. Furthermore, it was an object to provide magnetic polymer particles which encase the magnetic material such that leaching is greatly reduced or substantially absent.

SUMMARY

The object was achieved by providing a method for producing magnetic polymer particles, the method comprising the steps of (a) providing a composition with the following components, a liquid monomer which is radical polymerizable, a radical initiator which is soluble in the monomer, a steric stabilizer, and a ferrofluid comprising surfactant-coated colloidal magnetic particles in a carrier fluid which is miscible with the monomer; (b) preparing an emulsion from a polar solvent which is immiscible with the monomer and the composition of step (a); (c) adding seed polymer particles to the emulsion, mixing to form a seeded emulsion, and incubating the seeded emulsion, thereby swelling the seed polymer particles; (d) activating the radical initiator and polymerizing the monomer in the swollen seed polymer particles; thereby producing the magnetic polymer particles.

BRIEF DESCRIPTION OF THE FIGURE

FIG. 1 Magnetic particles obtained using the procedure of Example 1; scanning electron micrograph, the white bar at the bottom of the picture indicates 5 μm.

The following examples and the FIGURE are provided to aid the understanding of the present invention, the true scope of which is set forth in the appended claims. It is understood that modifications can be made in the procedures set forth without departing from the spirit of the present disclosure.

DETAILED DESCRIPTION

A principal idea of the teachings disclosed herein is the swelling of polymer seed particles, polymerized from monomer in the form of unbranched polymer chain or with a low degree of branching (i.e. <5% [w/w] elements which cross-link polymer chains), the seed particles having diameters in the lower μm to nm range; The improved process as reported in here describes the swelling of the seed particles with magnetic polymerizable fluid (specifically stabilized super-paramagnetic core-particles with diameters advantageously selected <30 nm and suspended in a monomer solution—with or without the help of a solvation agent. With further great advantage, the monomer is a mixture of two or more polymerizable monomer species of which one is capable of acting as a cross-linker or branching agent in the polymerization process, and which advantageously is present in concentrations >5% [w/w].

The new approach herby results in the unique swelling of already polymerized seed particles in a magnetizable monomer solution and therefore resulting in not only chemically and mechanically stable (no iron bleeding) particles in the micrometer size range. Moreover, monodisperse magnetic polymer particles can be obtained.

For the purpose of the present disclosure, certain terms are defined as follows herein. In the event of a conflict in a definition in the present disclosure and that of a cited reference, the present disclosure controls.

As used herein, the term "comprising" means that other steps and other components that do not affect the end result may be utilized. The term "comprising" encompasses the expressions "consisting of," and "consisting, essentially of". The use of singular identifiers such as "the," "a," or "an" is not intended to be limiting solely to the use of a single component, but may include multiple components. For example, unless stated otherwise the expression "a compound" has the meaning of "one or more compound(s)". The term "and/or" means one or all of the listed elements or a combination of any two or more of the listed elements. Ranges are used herein as a shorthand for describing each and every value that is within the range (e.g., 1 to 5 includes 1, 1.5, 2, 2.75, 3, 3.80, 4, 5, etc.). Any value within the range can be selected as the terminus of the range. As used herein the term "room temperature", unless specified otherwise, means the ambient temperature of a typical laboratory, which is usually about that of standard ambient temperature and pressure (SATP, 25° C., 100 kPa). As used herein, a "purified" or "isolated" compound means the compound has been separated from the reaction mixture in which it was formed.

The term "substance" encompasses not only a pure material or compound but also mixtures of two or more materials or compounds. The verb "mix" or "mixing" denotes the action of uniting and blending two or more substances, resulting in a "mixture" of the substances.

The term "hydrophobic" as used herein describes a characteristic of a substance to repel water, and the characteristic renders the substance water-insoluble or water-immiscible. Hydrophobic substances thus encompass non-polar compounds that in contrast are soluble in non-polar solvents. Thus, the term "hydrophobic" denotes the water-/polar solvent-immiscible or water-/polar solvent-insoluble property of a hydrophobic substance, be it a liquid or a solid. Owing to their tendency to repel water as well as other polar compounds, particularly polar solvents such as but not limited to C1 and C2 alcohols, liquid hydrophobic substances in polar solvents often cluster together to form micelles. In line with the above, the term "hydrophobic solvent" encompasses all solvents which are water-immiscible liquids. The term further encompasses solvents which are immiscible with water-miscible solvents. A "water miscible", "hydrophilic" or "polar" (these terms are understood as being synonymous) solvent forms a biphasic mixture with a "water immiscible" or "hydrophobic" (these terms again understood as being synonymous) solvent. At the same time, a water-miscible solvent is water-soluble at any concentration or solvent/water ratio, resulting in a homogeneous, i.e. monophasic solution.

An amount of a first substance, the substance being either a solid or a liquid, is "soluble" in a second liquid substance if, upon being contacted and mixed with the second liquid substance, the amount of the first substance is dissolved to form a homogeneous mixture with the second liquid substance.

The term "insoluble" refers to the tendency of a solid first substance to remain a solid phase when contacted and mixed with a liquid second substance without a substantial amount of the first substance becoming dissolved in the liquid second substance. There may nevertheless be minute soluble amounts of the first substance which may actually be dissolved in the liquid second substance. Thus, taking into account very low solubility which may be the case, for the purpose of the present disclosure the term "insoluble", generally defining the property of a solid first substance with respect to a liquid second substance, denotes the property of the first having a residual solubility in the second of 0-10 g per kg, i.e. 0-1% [w/w], specifically 0-0.7% [w/w], more specifically 0-0.5% [w/w], more specifically 0-0.2% [w/w], more specifically 0-0.1% [w/w], even more specifically 0-0.05% [w/w].

A first and a second liquid substance are understood to be "miscible" if they are capable of being mixed in any ratio without separation of two phases.

The term "immiscible" refers to the tendency of a first and a second liquid substance to form separate liquid phases when contacted and mixed with each other. Typically, a hydrophobic liquid substance and a hydrophilic liquid substance or water are "biphasic" when contacted with each other, i.e. the two liquid substances form two separate phases after being united. While the property of being immiscible implies that no substantial amount of the first substance is dissolved in the second, there may nevertheless be minute soluble amounts which may actually be dissolved in the opposite phase. For example, toluene (methylbenzene) is substantially insoluble in water, and a mixture of toluene and water typically shows phase separation. Nevertheless, at room temperature and under otherwise ambient conditions, an amount of about 0.5 g of toluene is soluble in 1 kg of water. Thus, taking into account very low solubility which may be the case, for the purpose of the present disclosure the term "immiscible", generally defining the property of a liquid first substance with respect to a liquid second substance, denotes the property of the first having a residual solubility in the second of 0-10 g per kg, i.e. 0-1% [w/w], specifically 0-0.7% [w/w], more specifically 0-0.5% [w/w], more specifically 0-0.2% [w/w], more specifically 0-0.1% [w/w], even more specifically 0-0.05% [w/w]. Thus, according to this definition a hydrophobic liquid first substance is immiscible with a hydrophilic liquid second substance if the solubility of the hydrophobic liquid substance in the hydrophilic liquid substance, or vice versa, is 0-1% [w/w], 0-0.7% [w/w], 0-0.5% [w/w], 0-0.2% [w/w], 0-0.1% [w/w], or 0-0.05% [w/w].

Depending on solubility and/or miscibility, mixing a first and a second substance of which at least one is a liquid results either in a heterogeneous mixture with two or more phases, or in a homogeneous mixture consisting of only a single liquid phase.

The term "dispersion" in its broadest meaning is understood as heterogeneous mixture in general, that is to say a composition comprising more than one phase, i.e. comprising a "dispersed phase" and a "continuous phase". Specific but not limiting examples for dispersions are a biphasic solid/liquid mixture and a biphasic liquid/liquid mixture. In the broadest sense, the substance of the dispersed phase is divided into separate compartments, droplets or particles, i.e. separate entities which are separated from each other by the continuous phase. By the same token the continuous phase represents an uninterrupted entity which engulfs the particles, droplets or other compartments of the dispersed phase. In the specific embodiment of a "suspension" the dispersed phase consists of finely divided solid particles dispersed in a liquid as the continuous phase. A dispersion where the dispersed phase is a liquid first substance and the continuous phase is a liquid second substance is referred to as an "emulsion", thus being another specific embodiment of a dispersion. An emulsion can be formed by contacting and mixing two or more liquids of which at least two are immiscible. Typically and specifically for the purpose of the present disclosure, the continuous phase is a liquid. The term "emulsion" also includes mixtures of two immiscible liquid phases of which one comprises a colloid. In this regard, the term "colloid" denotes a mixture of finely divided particulate matter dispersed within a continuous medium in a manner that substantially prevents the particulate matter from settling or sedimenting completely under ambient conditions in a given amount of time, specifically within a time interval of 1 h to 24 h. For the purpose of the present disclosure, a non-limiting example of a colloid is a ferrofluid as described in here.

In further specific embodiments, a dispersion may comprise finely divided solid particles in a liquid substance. The liquid substance itself may either consist of a single liquid compound; alternatively, the liquid substance may comprise two or more liquid compounds which among each other are either miscible, or of which at least two compounds are immiscible and may be present as an emulsion. In the latter case the dispersion is triphasic and comprises as a first discontinuous phase the solid particles; the liquid phase being an emulsion comprises a second discontinuous phase and a continuous phase representing the third phase.

A first aspect as reported herein is a method for producing magnetic polymer particles, the method comprising the steps of
(a) providing a composition with the following components,
    i. a liquid monomer which is radically polymerizable,
    ii. a radical initiator which is soluble in the monomer,
    iii. a steric stabilizer, and
    iv. a ferrofluid comprising surfactant-coated colloidal magnetic particles in a carrier fluid which is miscible with the monomer;
(b) preparing an emulsion from (A) a polar solvent which is immiscible with the monomer and (B) the composition of step (a);
(c) adding seed polymer particles to the emulsion, mixing to form a seeded emulsion, and incubating the seeded emulsion, thereby swelling the seed polymer particles;
(d) activating the radical initiator and polymerizing the monomer in the swollen seed polymer particles;
thereby producing the magnetic polymer particles.

The composition of step (a) comprises a monomer. The term "monomer" in the broadest sense denotes a compound comprising an unsaturated functional group with a radical polymerizability.

The term "monomer" thus generally includes monomers capable of becoming covalently linked to a growing polymer chain in a chemical process of free radical polymerization. However, the term also includes (i) a monomer capable of effecting elongation of a polymer chain as well as (ii) a monomer capable of effecting chain elongation and branching. In the latter case a monomer comprises two or more unsaturated functional groups with a radical polymerizability. The term "monomer" further includes mixtures of different particular monomer species, e.g. a mixture of a vinyl aromatic monomer and an acrylic monomer. The skilled artisan is well aware of such mixtures and routinely applies particular ratios of a monomer with a single unsaturated functional group with a radical polymerizability and a further monomer with two or more unsaturated functional groups with a radical polymerizability, depending on the desired degree of branching.

In an advantageous embodiment, the monomer is an ethylenically unsaturated monomer. Such compounds are known to the art and include vinyl aromatic monomers, acrylic monomers, vinyl ester monomers, vinyl ether monomers, and polyvinyl monomers. An example of a vinyl aromatic monomer can be selected from the group consisting of styrene, α-methylstyrene, vinyltoluene, α-chlorostyrene, o-chlorostyrene, m-chlorostyrene, p-chlorostyrene, p-ethylstyrene, sodium styrene-sulfonate and divinylbenzene. An example of an acrylic monomer can be selected from the group consisting of acrylic acid, methacrylic acid, methyl acrylate, ethyl acrylate, butyl acrylate, 2-ethylhexyl acrylate, cyclohexyl acrylate, phenyl acrylate, methyl methacrylate, hexyl methacrylate, 2-ethylhexyl methacrylate, ethyl β-hydroxyacrylate, butyl γ-hydroxyacrylate, butyl δ-hydroxyacrylate, ethyl β-hydroxymethacrylate, propyl γ-aminoacrylate, and propyl γ-N,N-diethylaminoacrylate. An example of a vinyl ester monomer can be selected from the group consisting of vinyl formate, vinyl acetate and vinyl propionate. An example of a vinyl ether monomer can be selected from the group consisting of vinylmethyl ether, vinylethyl ether, vinyl-n-butyl ether, vinylphenyl ether and vinylcyclohexyl ether. An example of a polyvinyl monomer can be selected from the group consisting of divinylbenzene, diallyl phthalate and triallyl phthalate. These and other suitable monomers can be used singly or in the form of mixtures of two or more of them. A non-limiting example for a monomer which can be used advantageously to practice the teachings of the present disclosure is a mixture of vinylbenzene and divinylbenzene.

For the purpose of the present disclosure the monomer is a compound which in one embodiment can be provided in pure form as a liquid. Alternatively, the monomer can be provided comprised in a solution wherein the solvent specifically is a hydrophobic solvent. Thus, in a specific embodiment the liquid monomer is a monomer dissolved in a hydrophobic solvent, more specifically in an organic hydrophobic solvent. Thus, one or more monomers are provided in dissolved form in a hydrophobic solvent, that is to say the solution as provided is a homogeneous mixture. Importantly, the hydrophobic solvent does not take part in the polymerization process and is selected not to comprise a functional group with radical polymerizability. The skilled artisan is aware of a large number of solvents which can be combined with a monomer to form a homogeneous solution. In a specific embodiment the liquid monomer is a monomer dissolved in a hydrophobic solvent selected from the group consisiting of propane, butane, cyclobutane, pentane, cyclopentane, heptane, hexane, cyclohexane, tetradecane, benzene, toluene, xylene, methylisopropylbenzene, methyl n-amyl ketone, isobutyl isobutyrate, and a mixture thereof.

The skilled person appreciates that any application of volatile compounds like propane, butane and others require a pressure-controlled containment to practice the teachings as disclosed in here, in order to allow such compounds to remain in the liquid state of aggregation when provided to form a composition as disclosed in here.

The improved successive seeded emulsion polymerization process disclosed herein comprises the step of swelling seed particles with one or more radical polymerizable monomer(s), followed by polymerizing the monomers. The terms "radical polymerizable" and "radically polymerizable" signify that the one or more monomers can be polymerized in a chemical process of free radical polymerization, triggered by a radical initiator.

A "radical initiator" is a compound capable of producing radical species, thereby promoting radical reactions. A radical initiator typically possesses a bond with a small bond dissociation energy. Radical initiators are particularly useful in polymer synthesis. Typical examples for radical initiators are are halogen molecules, azo compounds, and organic peroxides. In a specific advantageous embodiment, the radical initiator is selected from the group consisting of 2,2'-azobis-(2-methylbutyronitrile), azobisisobutyronitrile, azobisdimethylvaleronitrile, dicumyl peroxide, cumene hydroperoxide, benzoyl peroxide, dibenzoyl peroxide, lauroyl peroxide, t-butyl hydroperoxide, di-t-butyl peroxide, t-butyl-peroxybenzoate, t-butyl-peroxypivalate, dioctanoyl peroxide, and a mixture thereof. Activation of the radical initiator can be effected by exposure to electromagnetic radiation of suitable frequency and energy content. Radiation includes heat (infrared radiation), UV light, gamma radiation, and others. Any hydrophobic radical initiator can be used. In the case of polymerization by ultraviolet rays, a photopolymerization initiator such as but not limited to Irgacure® 2959 is selected among known photopolymerization initiators.

An alternative way of activation includes use of a catalyst capable of interacting with the radical initiator.

As a result, activation of the radical initiator typically generates a pair of radicals per single bond with small bond dissociation energy. Each of the radicals subsequently reacts with a monomer thereby starting the process of free radical polymerization. A "polymer" resulting from the polymerization process includes homopolymers and copolymers of any length (including oligomers); a "copolymer" includes a polymer of two or more types of polymerizable monomers, and therefore includes terpolymers, tetrapolymers, etc., which include random copolymers.

In a specific embodiment the liquid monomer serves as a solvent for the radical initiator. In another specific embodiment the liquid monomer comprises a hydrophobic solvent, and in this case the hydrophobic solvent can advantageously also serve as solvent for the radical initiator. Alternatively and in another specific embodiment, liquid monomer (with or without hydrophobic solvent) is emulsified in a polar liquid, and the radical initiator is present in the polar liquid in dissolved form.

The magnetic particles to be incorporated into the seed polymer particles during the swelling process are initially provided as a ferrofluid. Known to the skilled person, a ferrofluid is a colloidal fluid containing ferromagnetic or ferrimagnetic particles (nanoparticles) with a size of e.g. 1 to 50 nm. For the purpose of the present disclosure, the diameter of the particles of the ferrofluid which can be used advantageously in the process described herein is smaller than 20 nm. Generally, the size of the particles in the ferrofluid is chosen according to the structure of the polymer in the seed particles, and according to the conditions under which the swelling of the seed particles takes place. Magnetic particles of a particular size are chosen, in order to ensure during the swelling process penetration of the entire seed polymer particle with magnetic particles. Thus, particle sizes of 1 nm to 20 nm were generally found to be suited for practicing the improved successive seeded emulsion polymerization process as disclosed herein. In a more specific embodiment, the particle size is 5 nm to 20 nm, more specifically particles with a size in [nm] selected from the group consisting of 1, 2, 3, 4, 5, 6, 7, 8, 9, 10, 11, 12, 13, 14, 15, 16, 17, 18, 19, and 20 nm can advantageously be used to practice the teachings as disclosed herein.

The colloidal ferromagnetic or ferrimagnetic particles comprised in the ferrofluid, and used in the methods and compositions disclosed herein, usually are superparamagnetic, this property being encompassed by the term "magnetic". In this regard, superparamagnetic particles in a specific embodiment are of particular advantage. Magnetic nanoparticles can be prepared by precipitation of magnetite with ammonia out of a solution of iron salts.

Thus, for the purpose of the present disclosure, the ferrofluid comprises the magnetic particles in colloidal form in a "carrier fluid". The carrier fluid is the continuous phase of the colloid and comprises a liquid solvent which is miscible with the liquid monomer. Typically, the carrier fluid is a hydrophobic solvent which does not take part in a polymerization of the improved successive seeded emulsion polymerization process as disclosed in here.

Usually, without a specific helper substance a suspension of magnetic nanoparticles is not stable on its own. Magnetic attraction between the particles, combined with surface-driven effects such as Van der Waal's forces, will result in quick agglomeration and settling of the magnetic phase. In order to prevent the particles from agglomerating, a surfactant is advantageously used for different liquid carriers. Being a colloid, the ferrofluid thus comprises a "surfactant" denoting a compound that lowers the surface tension or interfacial tension between the carrier fluid and the magnetic particles. In the ferrofluid each particle is coated by the surfactant and as a result agglomeration of the magnetic particles is prevented. At room temperature stabilized colloidal magnetic nanoparticles with an average diameter of 10 nm usually remain uniformly distributed within their carrier fluid for 24 h or longer. Larger particles show an increasing tendency to settle. However this gravity effect can be counteracted by agitation, e.g. by stirring.

An exemplary surfactant present in a number of ferrofluids is oleic acid. Suitable ferrofluids to practice the disclosures herein are commercially available and include Ferrofluid Type EFH1, supplied by SmartPhysik.de, Berlin, Germany. In another specific embodiment, the surfactant acting as a stabilizer in the ferrofluid is capable of taking part in a radical polymerization reaction. A surfactant of this embodiment comprises a compound with one or more accessible vinyl or acrylic functional groups which are radically polymerizable. The term "accessible" in this regard signifies that the polymerizeable functional groups are capable of being reacted with monomer despite the stabilizer compound being attached to colloidal magnetic matter. In the present context such a stabilizer compound in the ferrofluid is also referred to as a "surf-mer".

The "steric stabilizer" being part of the composition as provided in step (a) of the method as disclosed herein includes one or more compounds which in a biphasic mixture of two immiscible liquid substances are partially soluble in both the hydrophobic and the hydrophilic component. Upon emulsifying the two components the steric stabilizer reduces the tendency of the two phases to separate again, thereby prolonging the emulsified state of the biphasic mixture. In a particular example, in an emulsion having a polar solvent as the continuous phase and a hydrophobic liquid as the discontinuous phase, the steric stabilizer suppresses or prevents fusion of hydrophobic droplets by stabilizing their steric distance. In a specific embodiment, the steric stabilizer prevents phase separation of the biphasic mixture. Advantageously, the steric stabilizer is selected from the group consisiting of poly(vinyl alcohol), poly(acrylic acid), poly(acrylamide), polyethylene oxide, poly(N-vinylpyrrolidone), (methyl) cellulose, (ethyl) cellulose, (hydroxypropyl) cellulose, poly(acrylic acid), poly(dimethylsiloxane), poly(isobutylene), poly(12-hydroxystearic acid), poly(2-ethylhexyl methacrylate), sodium dodecylsulfate, and a mixture thereof. Among them, a polymeric steric stabilizer such as poly(vinyl alcohol) and poly(N-vinylpyrrolidone) can be used in a particularly advantageous embodiment, particularly in a combination with sodium dodecylsulfate.

In specific embodiments the steric stabilizer is used in an amount of 0.1% to 100% [w/w], especially 1% to 20% [w/w], based on the seed polymer particles, and that the radical initiator be used in an amount of 0.001 to 10% [w/w], especially 0.01 to 0.5% [w/w], based on the monomer.

As a result, the composition of step (a) with the monomer, the radical initiator, the steric stabilizer, and the ferrofluid comprises a liquid phase and a particulate phase, and the liquid phase is a composition which is substantially hydrophobic. However, the particulate phase in the composition is comprised as a colloid.

In order to practice the disclosures as reported in here, an advantageous composition according to step (a) has a viscosity which allows to effectively form an emulsion with a polar solvent which is immiscible with the monomer. Thus, in specific embodiments the overall viscosity of the composition according to step (a) at room temperature and in the absence of a magnetic field (other than the earth magnetic field) is 0.5 mPa·s to 1300 mPa·s.

Following the provision of the composition of step (a) an emulsification step (b) is performed. To this end, a further liquid phase is provided, wherein the further liquid phase is hydrophilic and capable of forming a heterogeneous, i.e. biphasic mixture with the liquid phase of the composition of step (a); that is to say, the hydrophilic liquid phase comprises a polar, water-miscible solvent. In a specific embodiment, the polar solvent is selected from the group consisting of water, methanol, ethanol, and a mixture thereof. Other specific embodiments include polyhydric alcohols such as ethylene glycol, propylene glycol, butane-diol, diethylene glycol, triethylene glycol, and a mixture thereof. The water-miscible organic solvent can be used singly or in the form of a liquid mixture with water. In case of the liquid mixture, it is preferred that water be contained in an amount as large as possible, and the mixing ratio is determined according to the monomer and organic solvent used.

In order to form an emulsion, the composition of step (a) is contacted and mixed with the hydrophilic liquid phase, wherein an emulsion is obtained by way of mixing. In a typical embodiment, mixing is effected by stirring.

In the emulsion which is obtained, the hydrophilic liquid phase must be present in a sufficient amount so that it forms the continuous phase of the emulsion. Thus, the volume of the hydrophilic liquid phase is chosen relative to the volume of the composition of step (a), in order to provide enough volume to form a continuous phase. The volume ratio furthermore influences the size of the droplets of the hydrophobic phase which are formed in the emulsification process. Droplet size is also affected by the strength with which shear force by agitation is applied to the composition to be emulsified. Another factor determining droplet size is the concentration of the steric stabilizer in the emulsion. Generally, the steric stabilizer must be present in an amount above its minimal micelle-forming concentration. In general, conditions are applied to form stabilized hydrophobic droplets in the emulsion, wherein the polar solvent forms the continuous phase of the emulsion.

The process for producing magnetic polymer particles as disclosed in here is an improved variant of the Ug successive seeded emulsion polymerization elstad process for producing monodisperse polymer particles. Monodisperse particles are characterized by a rather uniform size, e.g. expressed as the mean particle diameter, wherein the coefficient of variation of the diameter is less than 10%, specifically less than 5%, and more specifically less than 3%. Generally it is known to the art that polymer particles can be produced in an emulsified biphasic mixture by allowing a monomer and a polymerization initiator to diffuse into polymer seeds added to the mixture. The seeds having the property to absorb monomer swell, and following initiation of polymerization, e.g. by heating to activate the initiator, larger polymer particles are produced from the swollen seeds. The authors of the present disclosure found that under certain conditions polymer seeds are not only capable to absorb the monomer and the polymerization initiator, but also magnetic particles. Thus, with surprising advantage a simplified process was developed, in order to produce magnetic particles which are monodisperse, contain reproducible amounts of magnetic material, wherein the magnetic material is evenly distributed throughout a given particle. Also importantly, no nitration step is required to perform the process disclosed herein.

The process as reported in here comprises forming a seeded emulsion, the emulsion comprising a polar solvent which is immiscible with the monomer, and the composition of step (a). That is to say, seed polymer particles are added to the emulsion and mixed therewith. In specific embodiments, the seed particles consist of a polymerized single monomer compound also present in the composition of step (a). In another specific embodiments, the seed particles consist of a polymerized mixture of two or more single monomer compounds also present in the composition of step (a). In yet another specific embodiment, the seed particles are particles of polymerized non-cross-linked (i.e. unbranched) styrene. In yet another specific embodiment, the seed particles are particles of polymerized low-cross-linked styrene, i.e. a branched co-polymer of styrene with 0.5% [w/w] divinylbenzene.

In the resulting mixture the hydrophobic seed particles become separated from the continuous phase and compartmentalized in hydrophobic emulsion droplets. During a given time interval the seed particles are allowed to swell, i.e. absorb the composition according to step (a) including the monomer (e.g. divinylbenzene and styrene as exemplified) and the colloidal magnetic particles.

The amount of seed particles that is added to a particular composition of step (a) is chosen in relation to the total amount of compounds which are present in the composition and which are capable of being absorbed by the seed particles. Thus, the particular suitable amount of seed particles may be determined on an empirical basis.

The emulsion with the seed particles is mixed. By way of agitating, an equal distribution of the seed particles and the other components in the mixture is achieved. Importantly, the seed particles having the property to absorb monomer are hydrophobic themselves. Accordingly, an exemplary seed particle is taken up by a hydrophobic droplet of the emulsion, whereby the seed particle is contacted with the composition provided by step (a). Upon being contacted therewith, the seed particle starts to absorb the composition and swells, i.e. grows in size. Absorption may continue until the amount of the composition that was initially present in the droplet is absorbed. As an effect of agitation of the mixture, an increasing inertia (resistance to change its motion or direction) of a growing particle, shear force and other influences, a growing particle may also become detached from the hydrophobic droplet, thereby interrupting the absorption and swelling process. The particle may contact another droplet and the absorption/swelling process continues.

Importantly, the swelling process not only involves absorption of monomer and radical initializer but also colloidal magnetic particles at the same time. Thus, the swelling of the seed particles leads to an even distribution of the magnetic particles during the size enlargement of the seed particles.

The amounts of hydrophobic solvent, if present in the composition of step (a), monomer, and carrier fluid are measured and chosen such that during the swelling process the polymeric matrix initially present in the seed particles does not become completely dissolved but remains intact as a scaffold, however expanded, and enfolding the absorbed matter.

At the end of the swelling process, in one embodiment, all material of the composition of step (a) is absorbed.

Alternatively. In another embodiment the composition of step (a) is present in excess, relative to the capacity of the seed particles to take up material. In this case the swelling process requires separation of the swollen particles from the remaining composition, e.g. by filtering. However, other separation methods exist such as but not limited to centrifugation and magnetic separation. Separated particles are subsequently dispersed again in a polar solvent, optionally in the presence of a surfactant, thereby confining the hydrophobic matter to the individual particles.

In a subsequent step of fixation the radical initiator is activated. By triggering radical polymerization, monomer polymerizes. In specific embodiments the monomer is a mixture of two or more different radically polymerizable compounds of which in a further specific embodiment at least one provides a chain-elongating and branching function. Polymerizing such monomer essentially leads to newly generated polymer matrix interlaced with polymeric material of the original seed particle. In the case where the seed particle itself comprises a radically polymerizable functional group, this group may also take part in the polymerization reaction.

As a result of polymerization a lattice of polymer is generated which now stably enlaces the magnetic nanoparticles of the ferrofluid. That is to say, the polymerization step traps the matter which has been absorbed by the seed particles together with the monomer.

For reproducible results, the polymerization reaction is generally performed under controlled temperature conditions which permit to control the kinetics with which the polymerization reaction takes place. In an exemplary case, a 2,2'-azobis(2-methylbutyronitrile)-initiated polymerization reaction involving styrene and divinylbenzene, the radical initiator is activated at 60° C., and the reaction is performed during a pre-determined amount of time including temperature shifts to 70° C. and 80° C. at defined time points.

After completion of the polymerization reaction magnetic polymer particles are obtained which can then be separated from the polymerization reaction mixture, and which can be purified further. It is noted, however, that these steps are optional and do not represent necessary and/or specific embodiments of the enhanced successive seeded emulsion polymerization process es reported herein. Thus, the magnetic particles can be separated from the remaining reaction mixture by different methods such as, but not limited to filtration, centrifugation, and magnetic separation. Applying a magnetic field to immobilize the particles is in many cases the most straightforward approach since the remaining liquids can easily be drained away from the magnetic particles. One or more further washing step(s) with ethanol can particularly be used to remove residual colloidal magnetic nanoparticles from the magnetic polymer particles. Subsequent washing steps with water remove further residual traces of substances which were present the polymerization reaction mixture.

Purified magnetic polymer particles can dried and stored as dry matter, or they can be used to prepare suspensions in which they can be stored, too.

Moreover, the polymer portion of the magnetic polymer particles can be modified chemically and functionalized. A non-limiting example therefor is covalently coupling streptavidin to accessible sites on the particles.

EXAMPLE 1

Preparation of Magnetic Particles with an Average Size of About 1.7 μm

Unless stated otherwise, all procedures were performed at room temperature (about 20° C.) and otherwise ambient conditions. The amounts of 0.98 g poly(N-vinylpyrrolidone) K30 (PVP) and 0.13 g sodium dodecylsulfate were dissolved each in 49 ml water, the solutions were filled into a 500 ml flask and mixed. Further, 6.48 g divinylbenzene (98% purity) and 5.42 g filtered (to remove stabilizer and other impurities) styrene were added subsequently to the mixture under constant agitation. The amount of 0.35 g 2,2'-Azobis(2-methylbutyronitrile) was dissolved in 12.62 g toluene, and the solution was added to the mixture in the flask. Further, 2 ml of the ferrofluid (Type EFH1, supplied by SmartPhysik.de, Berlin, Germany) with surfactant-coated colloidal magnetic particles in a carrier fluid were added to the organic phase.

Using an overhead stirrer with a stirring blade at 1000 revolutions per minute the mixture was dispersed for 1 h to form an emulsion with an aqueous (polar) continuous phase and a hydrophobic discontinuous phase. To the emulsion 4.7 ml of a seed latex dispersion (5% [w/w]) was added, the dispersion comprising particles of polymerized non-cross-linked (i.e. unbranched) styrene with a particle size of 700 nm and dispersed in water. The seeded emulsion was stirred at 500 revolutions per minute for 20 h at room temperature.

Afterwards, a solution of 0.49 g PVP and 0.05 g potassium iodide in 50 ml water was added and stirred at 500 revolutions per minute for another 10 min. Afterwards, the temperature of the mixture was raised to 60° C. For a time interval of 1 h and while stirring at at 350 revolutions per minute the temperature of 60° C. was kept constant, followed by a rise to 70° C. and stirring under the same conditions for another 4 h. Subsequently, the temperature was raised to 80° C. and and stirred under the same conditions for another 2.5 h.

Afterwards the mixture was allowed to cool to room temperature while being stirred under the same conditions. The mixture was filtered through a 20 μm polyester filter. From the flow-through magnetic particles were separated by immobilizing the particles in a magnetic field and draining the liquids, followed by two washing steps with ethanol and several further washing steps with water.

The size of the magnetic particles which were obtained was determined by dynamic light scattering.

EXAMPLE 2

Preparation of Magnetic Particles with an Average Size of About 1.2 μm

Unless stated otherwise, all procedures were performed at room temperature (about 20° C.) and otherwise ambient conditions. The amounts of 1.97 g poly(N-vinylpyrrolidone) K30 (PVP) and 0.29 g sodium dodecylsulfate were dissolved together in 190 ml water, the solutions were filled into a 500 ml flask and mixed. Further, 13.68 g divinylbenzene (98% purity) and 5.42 g filtered (to remove stabilizer and other impurities) styrene were added subsequently to the mixture under constant agitation. The amount of 0.692 g 2,2'-Azobis(2-methylbutyronitrile) was dissolved in 25.24 g toluene, and the solution was added to the mixture in the flask. Further, 2 ml of the ferrofluid (Type EFH1, supplied by SmartPhysik.de, Berlin, Germany) with surfactant-coated colloidal magnetic particles in a carrier fluid were added to the organic phase.

Using an overhead stirrer with a stirring anchor at 1200 revolutions per minute the mixture was dispersed for 20 min to form an emulsion with an aqueous (polar) continuous phase and a hydrophobic discontinuous phase. Subsequently, ultrasound was applied using a sonicator (Hielscher S3 Sonotrode at 80% amplitude and 80% interval settings) for 20 min, but without stirring. Following sonication, the mixture was stirred at 300 revolutions per minute for 20 min. To the emulsion 9.4 ml of a seed latex dispersion (5% [w/w]) was added, the dispersion comprising particles of polymerized non-cross-linked (i.e. unbranched) styrene with a particle size of 700 nm and dispersed in water. The seeded emulsion was stirred at 500 revolutions per minute for 20 h at 35° C.

Afterwards, a solution of 1 g PVP and 0.1 g potassium iodide in 100 ml water was added and stirred at 500 revolutions per minute for another 15 min at room temperature. Afterwards, the temperature of the mixture was raised to 60° C. For a time interval of 2 h and while stirring at at 100 revolutions per minute the temperature of 60° C. was kept constant, followed by a rise to 70° C. and stirring under the same conditions for another 3 h. Subsequently, the temperature was raised to 80° C. and and stirred at 250 revolutions per minute for another 2.5 h.

Afterwards the mixture was allowed to cool to room temperature while being stirred under the same conditions. The mixture was filtered first through a 20 μm polyester filter, subsequently through a 10 μm polyester filter, then filtered through 450 nm pores of cellulose acetate membranes. During the last filtering step, the particles were washed with ethanol. The particles were resuspended in water and washed with water several times while being retained by a magnetic field.

The size of the magnetic particles which were obtained was determined by dynamic light scattering.

EXAMPLE 3

Determination of Iron Leaching from Magnetic Particles

An amount of 100 mg magnetic particles as prepared by the procedures of Example 1 or Example 2 were suspended in 5 ml water, and 2 ml 5 M HCl were added to the suspension and mixed. The mixture was transferred into a cuvette, placed into a UV-Vis spectrophotometer (Cary® 50, Varian, Inc.). Kinetic measurements were made every 30 s at 450 nm for a period of 30 min. After each measurement, the mixture was stirred with a spatula, and the magnetic particles were pulled to the bottom of the cuvette by applying a magnetic field.

No absorption at 450 nm indicating $FeCl_2$ salt in the supernatant was detected after 30 min.

The invention claimed is:
1. A method for producing magnetic polymer particles, the method comprising the steps of
   (a) providing a composition with the following components,
      i. a liquid monomer which is radical polymerizable,
      ii. a radical initiator which is soluble in the monomer,
      iii. a steric stabilizer, and
      iv. a ferrofluid comprising surfactant-coated colloidal magnetic particles in a carrier fluid which is miscible with the monomer;
   (b) preparing an emulsion from
      A. a polar solvent which is immiscible with the monomer, and
      B. the composition of step (a);
   (c) adding seed polymer particles to the emulsion, mixing to form a seeded emulsion, and incubating the seeded emulsion, thereby swelling the seed polymer particles;
   (d) activating the radical initiator and polymerizing the monomer in the swollen seed polymer particles;
   thereby producing the magnetic polymer particles.

2. The method of claim 1, wherein in step (a) the monomer is selected from the group consisting of a vinyl aromatic monomer, an acrylic monomer, a vinyl ester monomer, a vinyl ether monomer, a polyvinyl monomer, and a mixture thereof.

3. The method of claim 1, wherein in the composition in step (a) the liquid monomer is a monomer dissolved in a hydrophobic solvent selected from the group consisting of propane, butane, cyclobutane, pentane, cyclopentane, heptane, hexane, cyclohexane, tetradecane, benzene, toluene, xylene, methylisopropylbenzene, isobutyl isobutyrate, and a mixture thereof.

4. The method of claim 1, wherein in step (a) the radical initiator is selected from the group consisting of 2,2'-azobis-(2-methylbutyronitrile), azobisisobutyronitrile, azo-bisdimethylvaleronitrile, dicumyl peroxide, cumene hydroperoxide, benzoyl peroxide, dibenzoyl peroxide, lauroyl peroxide, t-butyl hydroperoxide, di-t-butyl peroxide, t-butyl-peroxybenzoate, t-butyl-peroxypivalate, dioctanoyl peroxide, and a mixture thereof.

5. The method of claim 1, wherein in step (b) the polar solvent is selected from the group consisting of water, methanol, ethanol, and a mixture thereof.

6. The method of claim 1, wherein in step (b) the polar solvent forms the continuous phase of the emulsion.

7. The method of claim 1, wherein in step (a) the surfactant in the ferrofluid comprises a radically polymerizable compound.

* * * * *